United States Patent
Chen et al.

(10) Patent No.: US 11,057,556 B2
(45) Date of Patent: Jul. 6, 2021

(54) DISPLAY PANEL AND DISPLAY DEVICE USING SAME

(71) Applicant: HON HAI PRECISION INDUSTRY CO., LTD., New Taipei (TW)

(72) Inventors: Chuan-Kun Chen, New Taipei (TW); Li-Chiao Huang, New Taipei (TW)

(73) Assignee: HON HAI PRECISION INDUSTRY CO., LTD., New Taipei (TW)

( * ) Notice: Subject to any disclaimer, the term of this patent is extended or adjusted under 35 U.S.C. 154(b) by 0 days.

(21) Appl. No.: 16/702,999

(22) Filed: Dec. 4, 2019

(65) Prior Publication Data

US 2020/0186688 A1 Jun. 11, 2020

Related U.S. Application Data

(60) Provisional application No. 62/776,470, filed on Dec. 7, 2018.

(51) Int. Cl.
*H04N 5/225* (2006.01)
*G02F 1/1368* (2006.01)
*G02F 1/1335* (2006.01)
*G02F 1/1362* (2006.01)

(52) U.S. Cl.
CPC ......... *H04N 5/2257* (2013.01); *G02F 1/1368* (2013.01); *G02F 1/133514* (2013.01); *G02F 1/133528* (2013.01); *G02F 1/136209* (2013.01); *H04N 5/2253* (2013.01)

(58) Field of Classification Search
CPC ... G02F 2001/133331; G02F 1/133514; G02F 1/133512; G02F 1/133308; G02F 1/133528; G02F 1/136209; G02F 1/1368; H04N 5/2257; H04N 5/2253; H04N 5/2252; H04M 1/0264
See application file for complete search history.

(56) References Cited

U.S. PATENT DOCUMENTS

| | | | | |
|---|---|---|---|---|
| 2002/0176038 A1* | 11/2002 | Watanabe | ......... | G02F 1/133526 349/112 |
| 2003/0184704 A1* | 10/2003 | Akiyama | .......... | G02F 1/133305 349/158 |
| 2012/0105400 A1* | 5/2012 | Mathew | ............... | H04N 5/2253 345/207 |
| 2012/0106063 A1* | 5/2012 | Mathew | ............ | G02F 1/133528 361/679.21 |

(Continued)

FOREIGN PATENT DOCUMENTS

| | | |
|---|---|---|
| CN | 106461173 A | 2/2017 |
| CN | 108681131 A | 10/2018 |

*Primary Examiner* — Rajarshi Chakraborty
*Assistant Examiner* — Fatima N Farokhrooz
(74) *Attorney, Agent, or Firm* — ScienBiziP, P.C.

(57) ABSTRACT

A display panel defines a display area surrounding a light transmission area, and a light shielding area between the display area and the light transmission area. The display panel includes a lower polarizer and a first light shielding material. The lower polarizer defines a first through hole. At least part of the first light shielding material is in the first through hole. The first light shielding material is aligned with the light shielding area and surrounds the light transmission area, so as to absorb light from a side of the lower polarizer away from the TFT array substrate toward the light transmission area. A display device using the display panel is also disclosed.

15 Claims, 6 Drawing Sheets

(56) References Cited

U.S. PATENT DOCUMENTS

| | | | | |
|---|---|---|---|---|
| 2012/0206669 | A1* | 8/2012 | Kim | G02F 1/1339 |
| | | | | 349/58 |
| 2012/0327325 | A1* | 12/2012 | Park | G06F 1/1686 |
| | | | | 349/58 |
| 2013/0176512 | A1* | 7/2013 | Posner | G02F 1/1333 |
| | | | | 349/33 |
| 2014/0063406 | A1* | 3/2014 | Park | G02F 1/1313 |
| | | | | 349/58 |
| 2014/0063407 | A1* | 3/2014 | Kwon | G02F 1/13338 |
| | | | | 349/58 |
| 2014/0118826 | A1* | 5/2014 | Jiao | G06F 3/041 |
| | | | | 359/491.01 |
| 2015/0241732 | A1* | 8/2015 | Kim | G02F 1/13394 |
| | | | | 349/58 |
| 2016/0202515 | A1* | 7/2016 | Watanabe | G06F 1/169 |
| | | | | 349/153 |
| 2017/0059771 | A1 | 3/2017 | Yuki et al. | |
| 2017/0068287 | A1* | 3/2017 | Jung | G06F 1/1637 |
| 2017/0187934 | A1* | 6/2017 | Kwak | G02F 1/1333 |
| 2017/0371204 | A1* | 12/2017 | Kaneki | H01L 51/0024 |
| 2019/0146146 | A1* | 5/2019 | Nakajima | G02B 6/0088 |
| | | | | 362/611 |
| 2019/0243427 | A1* | 8/2019 | Nakamura | H04N 5/2253 |
| 2019/0310501 | A1* | 10/2019 | Nagata | G02F 1/133371 |
| 2019/0310524 | A1* | 10/2019 | Nagata | G02F 1/133528 |
| 2019/0331960 | A1* | 10/2019 | Li | G02F 1/13318 |
| 2020/0064681 | A1* | 2/2020 | Son | G06F 1/1626 |
| 2020/0064968 | A1* | 2/2020 | Kim | H01L 27/323 |
| 2020/0117034 | A1* | 4/2020 | Yin | G02F 1/1339 |
| 2020/0166789 | A1* | 5/2020 | Yu | H04N 5/2253 |
| 2020/0321561 | A1* | 10/2020 | Park | H01L 51/56 |

\* cited by examiner

DISPLAY PANEL AND DISPLAY DEVICE USING SAME

FIELD

The subject matter herein generally relates to display devices.

BACKGROUND

A display device with a large display area (high screen ratio) is usually preferred by consumers. A display device having a high screen ratio refers to a display device having a narrow border with a notched area for a camera module. However, such display devices need to define an area for the camera module, and a through hole corresponding to the camera module is needed on the display panel to accommodate the camera module extending through the display panel. A display device with such a design may limit the screen ratio.

Therefore, there is room for improvement in the art.

BRIEF DESCRIPTION OF THE DRAWINGS

Implementations of the present disclosure will now be described, by way of embodiment, with reference to the attached figures.

DETAILED DESCRIPTION

Figure 1:
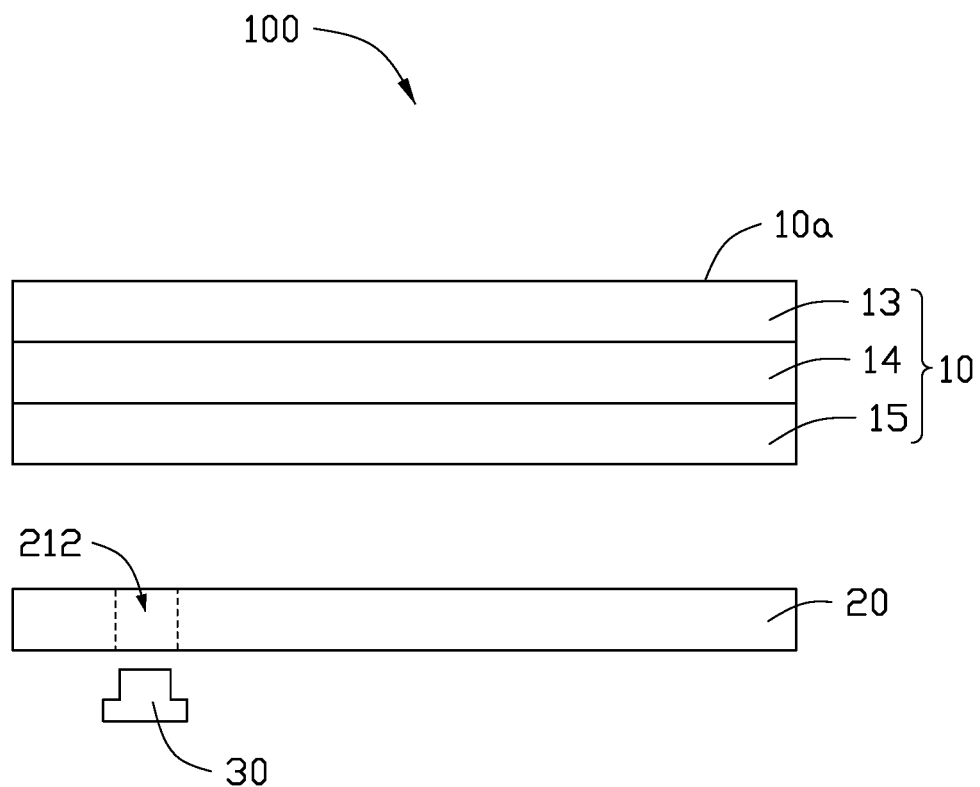
FIG. 1 is a structural diagram of a display device according to a first embodiment.

It will be appreciated that for simplicity and clarity of illustration, where appropriate, reference numerals have been repeated among the different figures to indicate corresponding or analogous elements. In addition, numerous specific details are set forth in order to provide a thorough understanding of the exemplary embodiments described herein. However, it will be understood by those of ordinary skill in the art that the exemplary embodiments described herein may be practiced without these specific details. In other instances, methods, procedures, and components have not been described in detail so as not to obscure the related relevant feature being described. Also, the description is not to be considered as limiting the scope of the exemplary embodiments described herein. The drawings are not necessarily to scale and the proportions of certain parts may be exaggerated to better illustrate details and features of the present disclosure.

The term "comprising" when utilized, means "including, but not necessarily limited to"; it specifically indicates open-ended inclusion or membership in the so-described combination, group, series, and the like. The disclosure is illustrated by way of example and not by way of limitation in the figures of the accompanying drawings in which like references indicate similar elements. It should be noted that references to "an" or "one" embodiment in this disclosure are not necessarily to the same embodiment, and such references can mean "at least one". The term "circuit" is defined as an integrated circuit (IC) with a plurality of electric elements, such as capacitors, resistors, amplifiers, and the like.

As shown in FIG. 1, a display device 100 includes a display panel 10, a backlight module 20 and a camera module 30. The display panel 10 has a display surface 10*a* for displaying images, and the backlight module 20 is on a side of the display panel 10 away from the display surface 10*a* to provide backlight for the display panel 10. The camera module 30 is on a side of the display panel 10 away from the display surface 10*a*. The backlight module 20 defines a mounting hole 212 extending through the backlight module 20 to receive the camera module 30.

The display panel 10 includes a thin film transistor (TFT) array substrate 15, a color filter (CF) substrate 13, and a liquid crystal layer 14. The TFT array substrate 15 is opposite the CF substrate 13. The liquid crystal layer 14 is between the TFT array substrate 15 and the CF substrate 13.

Figure 2:
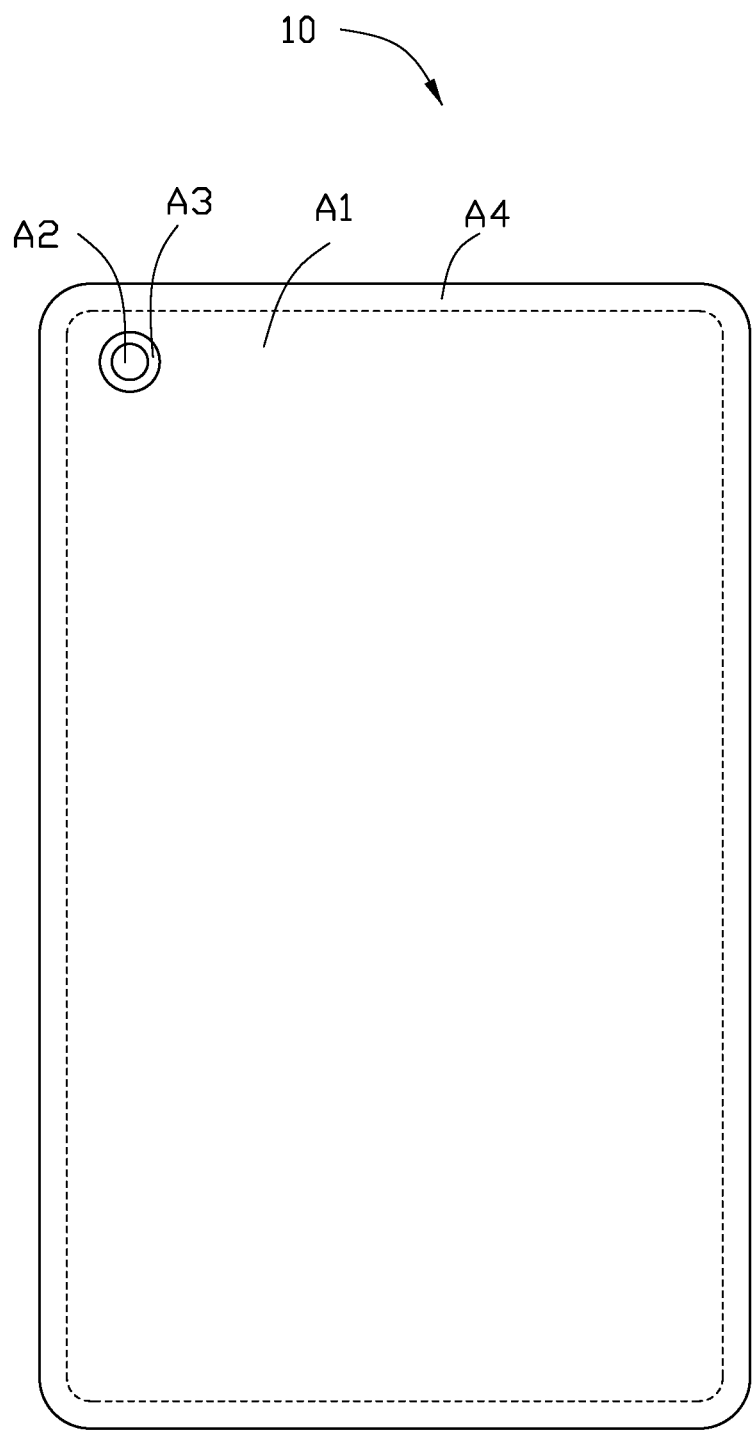
FIG. 2 is a top view of the display panel in FIG. 1.

As shown in FIG. 2, the display panel 10 defines a display area A1 for displaying images and a light transmission area A2 surrounded by the display area A1. The light transmission area A2 is transparent to allow external light to enter, and is not used for displaying images. The camera module 30 is installed in the mounting hole 212 and is aligned with the light transmission area A2. Light for images is collected through the light transmission area A2 surrounded by the display area A1, without opening a through hole in the display panel 10 to set up a special area for placing the camera module 30, thereby increasing the screen ratio of the display device 100.

Figure 3:
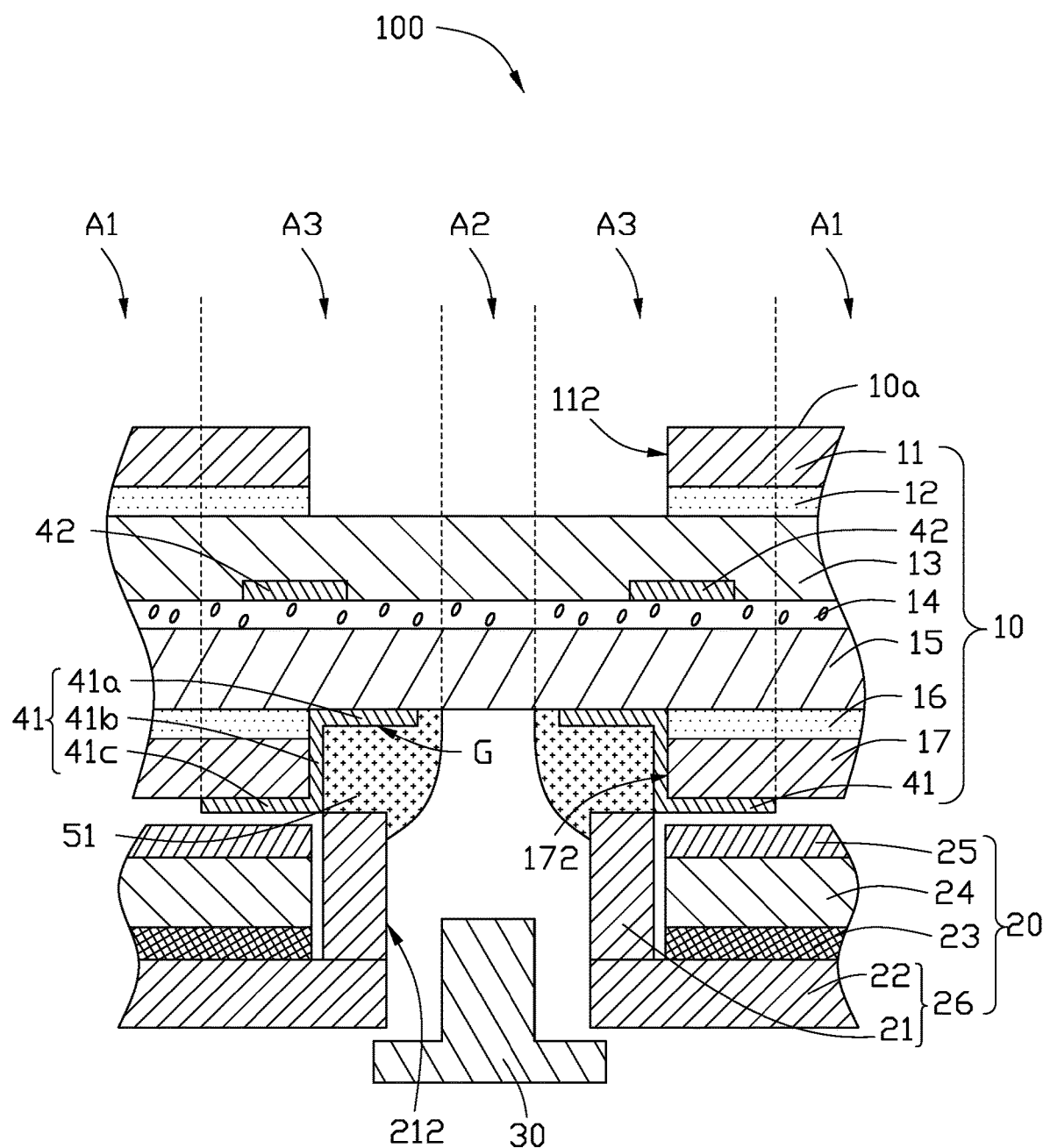
FIG. 3 is a cross-sectional view of the display device of FIG. 1.

Further, in the process of implementing the present application, the inventor of the present application found that at the combination of the display panel 10 and the backlight module 20, there is an area where the light of the backlight module 20 passes from the combination of the backlight module 20 and the display panel 10. The problem of light leakage, and due to the assembly process error between the backlight module 20 and the display panel 10, the frame 21 of the backlight module 20 (as shown in FIG. 3) is shifted to the display area near the light transmission area A2. In A1, the liquid crystal cell gap is deformed to form a dark light leakage problem. Therefore, in this application, a light leakage prevention design is also included to prevent the light of the backlight module 20 from entering the light transmission area A2 or to prevent light leakage in the dark state due to an assembly process error between the backlight module 20 and the display panel 10.

As shown in FIG. 2, the display panel 10 defines a light shielding area A3 between the display area A1 and the light transmission area A2. The light shielding area A3 surrounds the light transmission area A2. The display area A1 defines a plurality of pixels (not shown), and each pixel includes at least a red subpixel, a green subpixel, and a blue subpixel. The light transmission area A2 is transparent and allows external light to enter. The light transmission area A2 is not used for displaying images.

As shown in FIG. 2, the light transmission area A2 is circular, and the light shielding area A3 is in the shape of a ring to surround the light transmission area A2. In other embodiments, the light transmission area A2 and the light shielding area A3 may have other various shapes. For example, the light transmission area A2 may be rectangular, and the light shielding area A3 may be a rectangular ring. That is, the outer edge of the light shielding area A3 away from the light transmission area A2 is rectangular.

As shown in FIG. 2, the display panel 10 further defines a border area A4 surrounding the display area A1. The border area A4 can be used for wiring or placing gate driving circuits. In other embodiments, the display panel 10 may not include the border area A4 to achieve a full-screen display.

As shown in FIG. 3, the display panel 10 includes an upper polarizer 11, an upper adhesive layer 12, a CF substrate 13, a liquid crystal layer 14, a TFT array substrate 15, a lower adhesive layer 16, and a lower polarizer 17.

The TFT array substrate 15 is opposite to the CF substrate 13. The liquid crystal layer 14 is between the TFT array substrate 15 and the CF substrate 13. The upper polarizer 11 is on a side of the CF substrate 13 away from the TFT array substrate 15. The upper adhesive layer 12 is between the CF substrate 13 and the upper polarizer 11. The CF substrate 13 and the upper polarizer 11 are bonded together by the upper adhesive layer 12. The lower polarizer 17 is on the TFT array substrate 15 away from the CF substrate 13. The lower adhesive layer 16 is between the TFT array substrate 15 and the lower polarizer 17. The TFT array substrate 15 and the lower polarizer 17 are bonded together by the lower adhesive layer 16.

The TFT array substrate 15 includes a transparent first substrate (not shown), and a TFT array layer (not shown) on a side of the first substrate close to the CF substrate 13. The TFT array layer includes, for example, TFTs, scan lines, data lines, and the like. Pixel electrodes (not shown) and common electrodes (not shown) are also provided in the display area A1. Each sub-pixel includes one TFT and one pixel electrode electrically connected to the TFT. The pixel electrodes and the common electrodes are in the display area A1 and rotate the liquid crystal molecules in the liquid crystal layer 14 to form images for display.

In one embodiment, the CF substrate 13 includes a transparent second substrate (not shown), and a color filter layer (not shown) on a side of the second substrate near the TFT array substrate 15 (not shown), a black matrix (BM) (not shown), a protective layer (not shown), and so on. The CF layer includes, for example, a red filter layer in a red subpixel area, a green filter layer in a green subpixel area, and a blue filter layer in a blue subpixel area. The black matrix is between adjacent sub-pixels to prevent crosstalk of the primary color light emitted from the adjacent sub-pixels.

As shown in FIG. 3, the lower polarizer 17 defines a first through hole 172. The first through hole 172 penetrates the lower adhesive layer 16. The first through hole 172 is aligned with the light transmission area A2 along a thickness direction of the display device 100. The upper polarizer 11 defines a second through hole 112. The second through hole 112 penetrates the upper adhesive layer 12. The second through hole 112 is aligned with the light transmission area A2 along the thickness direction of the display device 100. In one embodiment, a material of the upper and the lower adhesive layer 12 and 16 may each be, but is not limited to, pressure sensitive adhesive (PSA).

As shown in FIG. 3, the backlight module 20 is on a side of the display panel 10 away from its display surface 10a. The backlight module 20 includes a back plate 26 configured for carrying optical components of the backlight module 20. The back plate 26 includes a flat plate-shaped bottom plate 22 substantially parallel to the display panel 10 and a frame 21 connected to the bottom plate 22. The frame 21 is shaped to define an inner wall of the mounting hole 212 extending to abut against a surface of the TFT array substrate 15. The frame 21 is opaque, to preventing the light of the backlight module 20 from leaking out from the frame 21. A material of the frame 21 is, for example, a metal or an alloy.

In other embodiments, the frame 21 and the bottom plate 22 may be integrally formed. That is, the frame 21 is formed by bending the bottom plate 22 and extending in a direction toward the display panel 10.

As shown in FIG. 3, the frame 21 is substantially perpendicular to the display panel 10. The frame 21 defines a mounting hole 212 penetrating the backlight module 20. The mounting hole 212 is aligned with the light shielding area A3 along the thickness direction of the display device 100. That is, the inner wall of the mounting hole 212 is in the light shielding area A3. The camera module 30 is embedded in the mounting hole 212 to reduce the thickness of the display device 100. A size of the mounting hole 212 is larger than or substantially equal to a size of the lens of the camera module 30.

The optical components of the backlight module 20 include a light source (not shown), a reflection sheet 23, a light guide plate 24, an optical film group 25, and so on. The reflection sheet 23, the light guide plate 24, and the optical film group 25 are sequentially stacked as stated on the bottom plate 22 in a direction close to the display panel 10. The reflection sheet 23, the light guide plate 24, and the optical film group 25 are basically flat plates. The mounting hole 212 penetrates the reflection sheet 23, the light guide plate 24, and the optical film group 25. That is, the reflection sheet 23, the light guide plate 24, and the optical film group 25 are all designed with openings. and surround the frame 21 of the backlight module 20.

In one embodiment, the backlight module 20 may be a direct type backlight module or an edge type backlight module. The light source may be a light-emitting diode. The optical film group 25 includes, for example, a diffusion sheet (not shown) or a brightness enhancement film (not shown).

As shown in FIG. 3, the display panel 10 includes a first light shielding material 41 on a side of the TFT array substrate 15 away from the CF substrate 13. The first light shielding material 41 is aligned with the light shielding area A3 and surrounds the light transmission area A2. At least part of the first light shielding material 41 is in the first through hole 172 for absorbing light from the lower polarizer 17 away from the TFT array substrate 15 toward the light transmission area A2.

The first light shielding material 41 includes a first horizontal portion 41a, a bent portion 41b, and a second horizontal portion 41c. The first horizontal portion 41a partially covers a surface of the TFT array substrate 15 (i.e., the first substrate). The bent portion 41b extends from the first horizontal portion 41a and covers sidewalls of the first through hole 172. The second horizontal portion 41c extends from the bent portion 41b in a direction away from the light transmission area A2 of the frame 21, and covers a surface of the lower polarizer 17 away from the TFT array substrate 15 (i.e., the first substrate). The first light shielding material 41 has light absorbing property, thereby preventing the light of the backlight module 20 from leaking out from an area where the display panel 10 and the backlight module 20 are combined.

In one embodiment, the projection of the frame 21 along the thickness direction of the display device 100 falls within a projection of the first through hole 172. The first horizontal portion 41a extends beyond the frame 21, in a direction in which the frame 21 approaches the light transmission area A2. The second horizontal portion 41c extends beyond the frame 21 in a direction in which the frame 21 is away from the light transmission area A2. That is, the left and right ends of the first light shielding material 41 extend beyond the frame 21, so that a size of the first light shielding material 41 is as large as possible to absorb more light entering the light shielding area A3 and the light transmission area A2.

In one embodiment, a material of the first light shielding material 41 may be, but is not limited to, ink, glue, and so on. If the material of the first light shielding material 41 is a light shielding ink (e.g., a black ink) with a high optical density (OD) value, its thickness is in a range from 5 microns to 15 microns.

As shown in FIG. 3, the CF substrate 13 includes a second light shielding material 42. The second light shielding material 42 is aligned with the light shielding area A3 and surrounds the light transmission area A2. The second light shielding material 42 is in the shape of a ring. In other embodiments, the second light shielding material 42 may have other various shapes.

In one embodiment, in order to simplify manufacturing process, the second light shielding material 42 and the black matrix are made of one material and formed by one patterning process (e.g., wet etching). In other embodiments, the second light shielding material 42 and the black matrix may be made independently, and the materials of the two may be different.

In one embodiment, an inner wall of the second through hole 112 is between an inner side surface of the second light shielding material 42 near the light transmission area A2 and an outer side surface of the second light shielding material 42 near the display area A1. That is, a projection of the inner wall of the second through hole 112 along the thickness direction of the display device 100 is within a projection of the second light shielding material 42 to ensure the light shielding effect.

In one embodiment, the display device 100 includes a first light shielding portion 51. The first light shielding portion 51 is in direct contact with the display panel 10 and the frame 21 to fix them. The first light shielding portion 51 is aligned with the light shielding area A3 and surrounds the light transmission area A2 to absorb light that is incident from the backlight module 20 into the light transmission area A2 and the light shielding area A3. That is, the first light shielding portion 51 cooperates with the first and the second light shielding material 41 and 42 to absorb as much light as possible to avoid light leakage, and also serve as an adhesive to fix the display panel 10 and the backlight module 20.

In one embodiment, a gap G is defined between the frame 21 and the first light shielding material 41. The first light shielding portion 51 is at least in the gap G That is, the frame 21 of the backlight module 20 is abutted against the first light shielding portion 51. In this case, a material of the first light shielding portion 51 may be an elastic glue, which has a certain buffering effect. After the display panel 10 and the backlight module 20 are assembled, the elastic glue serves as a link and a buffer preventing separation of the display panel 10 from the backlight module 20, and preventing cracking and failure of the first substrate (which is made of glass). In addition, the elastic compression deformation of the elastic glue prevents light leakage in the dark state due to an assembly process error between the display panel 10 and the backlight module 20.

In one embodiment, the first light shielding portion 51 extends from the gap G to a surface of the frame 21 near the light transmission area A2 and is in contact with the surface of the frame 21 near the display panel 10. Therefore, on the basis of maximally absorbing the light emitted from the backlight module 20 into the light shielding area A3 and the light transmission area A2, contact area of the first light shielding portion 51 and the frame 21 is increased, thus the fixing effect between the display panel 10 and the backlight module 20 is improved.

In one embodiment, a side surface of the first horizontal portion 41a near the light transmission area A2 and a side surface of the first light shielding portion 51 near the light transmission area A2 may be overlapped or staggered. That is, the first light shielding portion 51 may cover the side surface of the first horizontal portion 41a near the light transmission area A2 and contact the TFT array substrate 15 (the first substrate) (as shown in FIG. 3) to further increase the contact area between the first light shielding portion 51 and the display panel 10, thus the fixing effect between the display panel 10 and the backlight module 20 is further improved. The first light shielding portion 51 may not exceed the side surface of the first horizontal portion 41a near the light transmission area A2. The projection of the first light shielding material 41 along the thickness direction of the display device 100 coincides with the light shielding area A3, or the projection of the first light shielding material 41 is in all the shading areas A3.

The first light shielding material 41 and the first light shielding portion 51 mainly absorb the light emitted by the backlight module 20 into the light shielding area A3 and the light transmission area A2, and the second light shielding material 42 mainly absorbs light emitted through the liquid crystal layer 14 into the light shielding area A3.

In addition, in order to avoid light leakage to the light transmission area A2, the projections of the first and the second light shielding material 41 and 42, and the first light shielding portion 51 are superposed along the thickness direction of the display device 100 to cover the light shielding area A3. That is, the inner and outer edges of the area where the projections of the first and the second light shielding material 41 and 42, and the first light shielding portion 51 are superimposed are the inner edge of the light shielding area A3 near the light transmission area A2 and the outer edge of the light shielding area A3 near the display area A1. Therefore, the projections of the first light shielding material 41 along the thickness direction of the display device 100, the second light shielding material 42, and the first light shielding portion 51 may cover a part of the light shielding area A3, and may also cover the entire area of the light shielding area A3. It is sufficient to ensure that the projection superposition of the three completely covers the light shielding area A3.

In one embodiment, the material of the first light shielding material 41 is ink, and the material of the first light shielding portion 51 is elastic glue. When assembling the display panel 10 and the backlight module 20, only one inkjet process and one coating process are required. Compared with the case where the colloid is applied multiple times (at least twice) at the junction of the display panel 10 and the backlight module 20, the manufacturing tolerance of this method is small, and the manufacturing process is simplified.

In the display device 100, the light shielding area A3 is between the display area A1 and the light transmission area A2, and the first light shielding material 41 is arranged to correspond to the light shielding area A3. The light from the backlight module 20 toward the light shielding area A3 and the light transmission area A2 can be absorbed by the first light shielding material 41. The camera module 30 is aligned with the light transmission area A2 surrounded by the display area A1, without opening a through hole in the display panel 10 to set up a special area for placing the camera module 30, thereby increasing the screen ratio of the display device 100.

In addition, in the display device 100, the CF substrate 13 is further provided with the second light shielding material 42 corresponding to the light shielding area A3. The second light shielding material 42 absorbs light that has entered the light shielding area A3 after passing through the liquid crystal layer 14, and prevents light from the display area A1 from leaking into the light transmission area A2, thereby ensuring a display effect and an imaging effect.

Further, in the display device 100, by providing the first light shielding portion 51, the light emitted from the backlight module 20 toward the light shielding area A3 and the light transmission area A2 can be further absorbed, and the backlight module 20 and the display panel 10 can be bonded.

Figure 4:
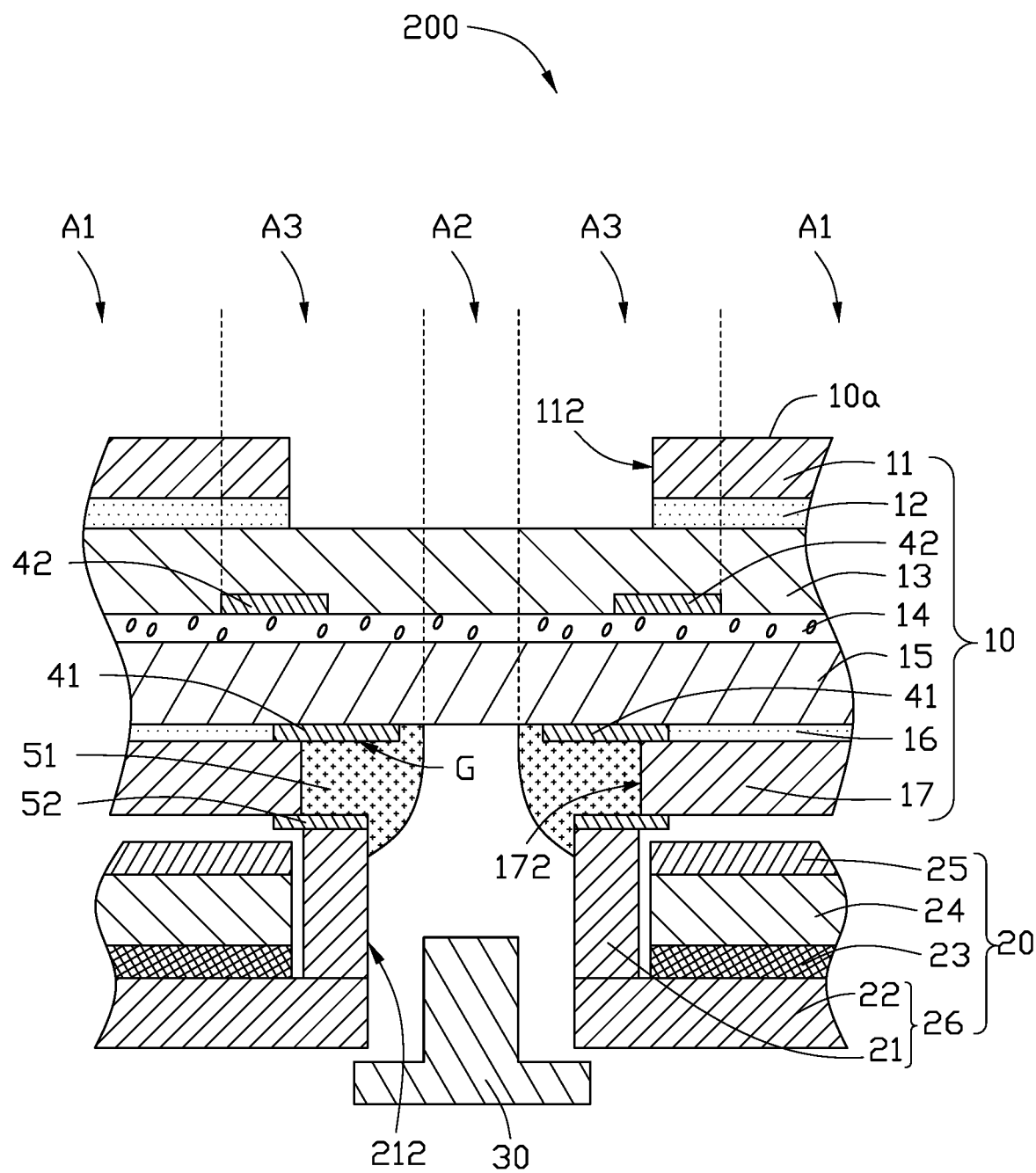
FIG. 4 is a cross-sectional view of a display device according to a second embodiment.

FIG. 4 shows a display device 200. As shown in FIG. 4, a difference between the display device 200 and the display device 100 is that a size of an opening defined by the lower adhesive layer 16 of the display device 200 is larger than a size of an opening of the lower polarizer 17 of the display device 200. In the display device 200, the first light shielding material 41 is between the TFT array substrate 15 and the lower polarized 17. The display device 200 further includes a second light shielding portion 52 between the lower polarizer 17 and the frame 21. The second light shielding portion 52 is aligned with the light shielding area A3 and surrounds the light transmission area A2. The second light shielding portion 52 along a direction of the frame 21 away from the light transmission area A2 extends beyond the frame 21.

In one embodiment, the material of the lower adhesive layer 16 is PSA, the material of the first light shielding material 41 is ink, the material of the first light shielding portion 51 is elastic glue, and the material of the second light shielding portion 52 is a double-sided tape.

During the manufacturing process, a pre-assembled liquid crystal display panel (mainly including a TFT array substrate 15, a CF substrate 13, and a liquid crystal layer 14) is provided. The surface of the TFT array substrate 15 away from the CF substrate 13 and correspondingly the light shielding area A3 is printed with ink to form a first light shielding material 41. PSA glue is attached to form the lower adhesive layer 16. The lower polarizer 17 is attached, and double-sided adhesive is attached to the frame 21 of the backlight module 20 to form the second light shielding portion 52. The backlight module 20 with the second light shielding portion 52 is attached to the liquid crystal display panel; and an elastic glue is applied to form the first light shielding portion 51.

In another embodiment, the second light shielding portion 52 may be in direct contact with the optical film group 25. That is, there is no gap between the second light shielding portion 52 and the optical film group 25. During the manufacturing process, a double-sided tape is attached to the optical film group 25 and the frame 21 to form the second light shielding portion 52.

The frame 21 of the backlight module 20 abuts against the second light shielding portion 52 (that is, the frame 21 is in direct contact with the second light shielding portion 52), and there is a gap G between the second light shielding portion 52 and the first light shielding material 41. The first light shielding portion 51 fills the gap G and directly contacts the surface of the TFT array substrate 15, a side surface of the second light shielding portion 52 near the light transmission area A2, and s side surface of the frame 21 defining the mounting hole 212. Therefore, on the basis of maximally absorbing the light emitted from the backlight module 20 into the light shielding area A3 and the light transmission area A2, the contact area between the first light shielding portion 51 and the display panel 10 is further increased, thus the fixing effect between the display panel 10 and the backlight module 20 is improved.

In the display device 200, the second light shielding portion 52 cooperates with the first and the second light shielding material 41 and 42, and the first light shielding portion 51 to absorb as much light as possible to avoid light leakage.

Figure 5:
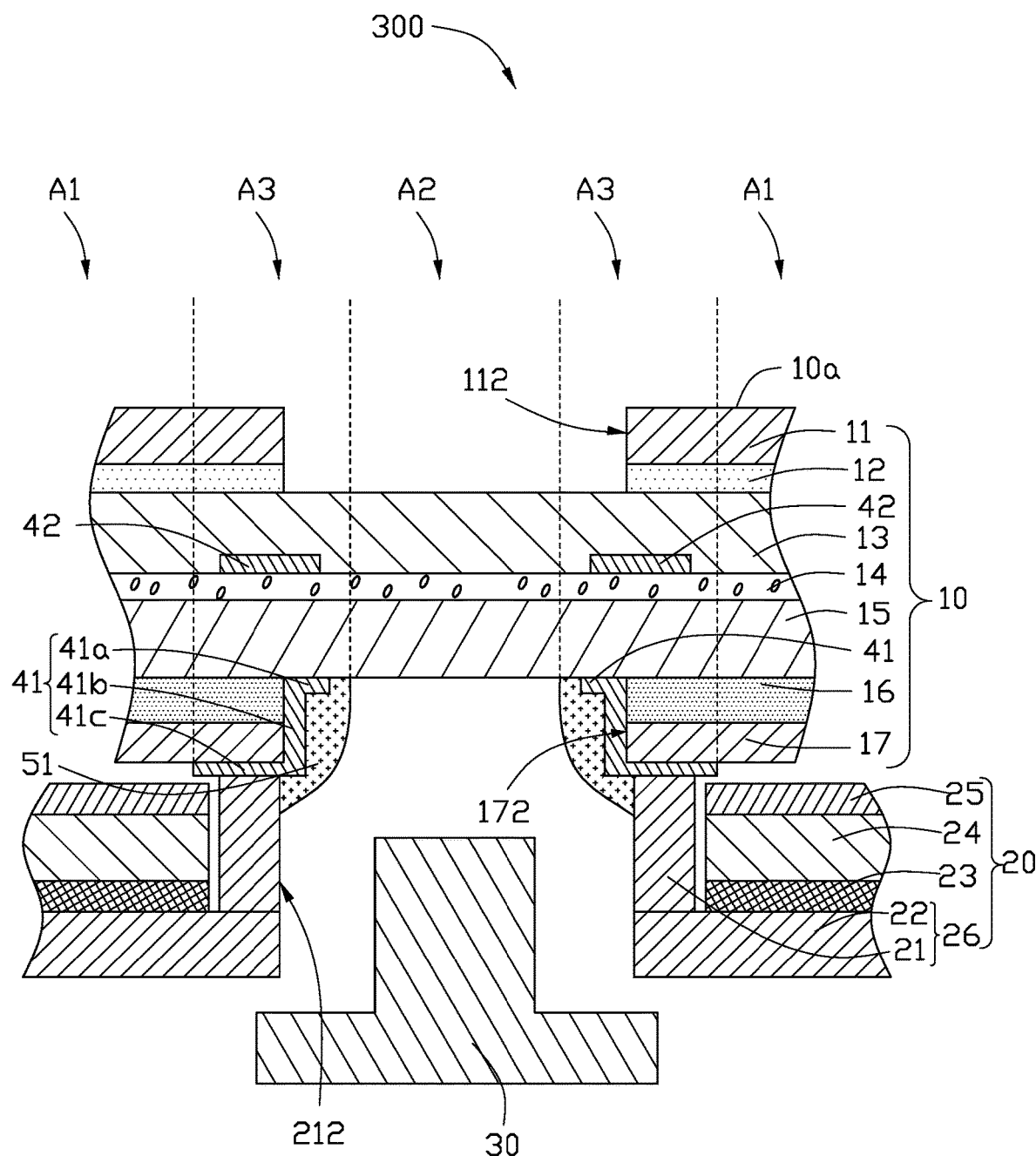
FIG. 5 is a cross-sectional view of a display device according to a third embodiment.

FIG. 5 shows a display device 300. As shown in FIG. 5, a difference between the display device 300 and the display device 100 is that a material of the lower adhesive layer 16 of the display device 300 is soft glue. The projection of the frame 21 along the thickness direction of the display device 100 at least partially overlaps the lower polarizer 17. That is, the size of the mounting hole 212 is equal to or larger than the size of the first through hole 172. Since the material of the lower adhesive layer 16 is soft glue, it has a certain buffering effect. After the display panel 10 and the backlight module 20 are assembled, the frame 21 contacts the first light shielding material 41, the force of the frame 21 on the display panel 10 can be released by compressing the soft glue. The dark light leakage problem caused by the frame 21 compressing the liquid crystal cell gap is avoided.

In one embodiment, the lower adhesive layer 16 is an optically clear adhesive (OCA), and the lower adhesive layer 16 and the lower polarizer 17 may be sequentially attached to the TFT array substrate 15. The lower polarizer 17 with the lower adhesive layer 16 is then attached to the TFT array substrate 15.

Figure 6:
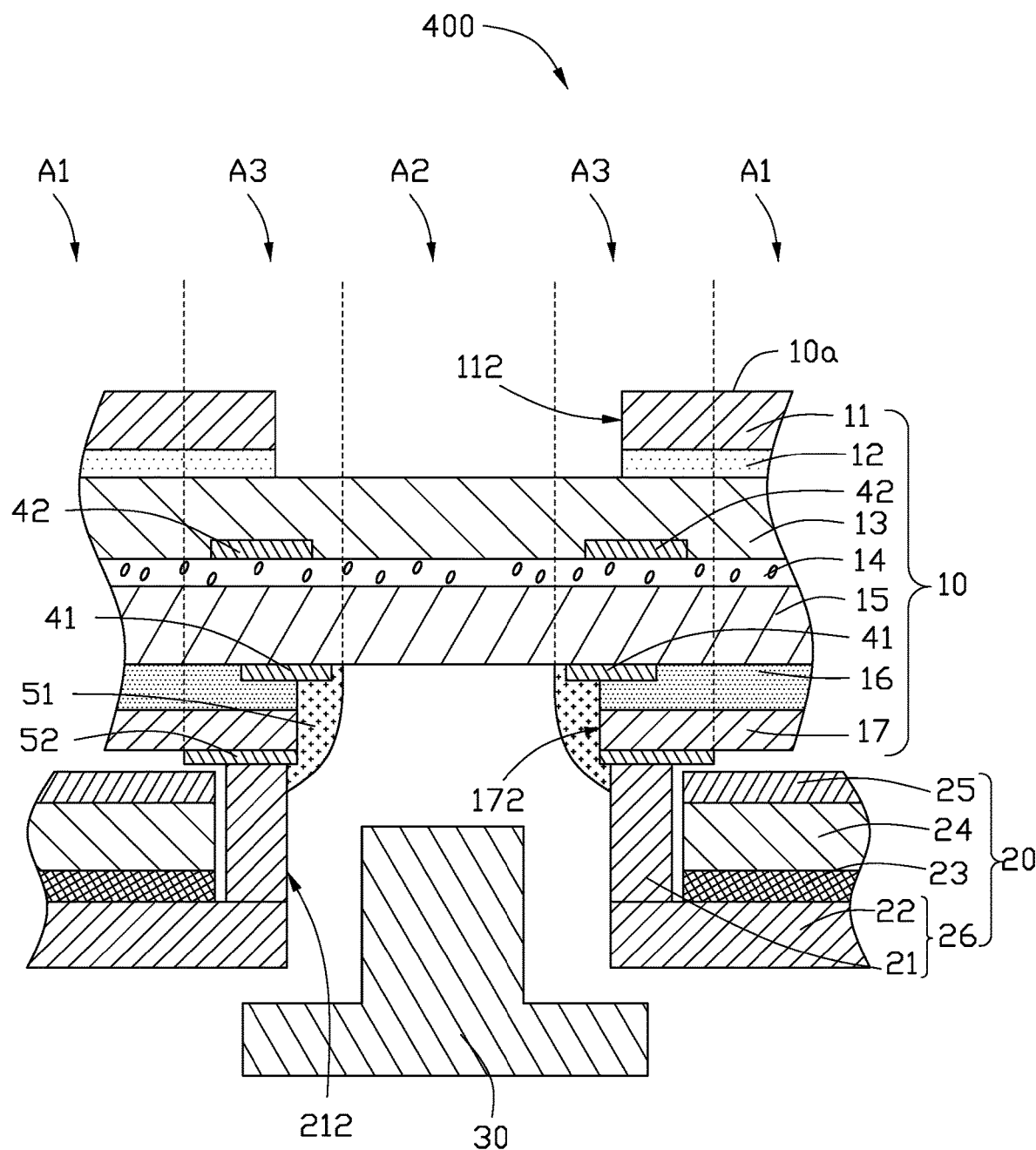
FIG. 6 is a cross-sectional view of a display device according to a fourth embodiment.

FIG. 6 shows a display device 400. As shown in FIG. 6, a difference between the display device 400 and the display device 200 is that the material of the lower adhesive layer 16 is soft glue. The projection of the frame 21 along the thickness direction of the display device 400 at least partially overlaps the lower polarizer 17. That is, the size of the mounting hole 212 is equal to or larger than the size of the first through hole 172. Since the material of the lower adhesive layer 16 is soft glue, it has a certain buffering effect. After the display panel 10 and the backlight module 20 are assembled, the frame 21 contacts the first light shielding material 41, the force of the frame 21 on the display panel 10 can be released by compressing the soft glue. The dark light leakage problem caused by the frame 21 compressing the the liquid crystal cell gap is avoided.

In one embodiment, the material of the lower adhesive layer 16 is an OCA, the material of the first light shielding material 41 and the second light shielding portion 52 is ink, and the material of the first light shielding portion 51 is an elastic glue. The side surface of the second light shielding portion 52 near the light transmission area A2 does not exceed the side surface of the lower polarizer 17 defining the first through hole 172. During the manufacturing process, a pre-assembled liquid crystal display panel (mainly including a TFT array substrate 15, a CF substrate 13, and a liquid crystal layer 14) is provided. The surface of the TFT array substrate 15 away from the CF substrate 13 and correspondingly the light shielding area A3 is printed with ink to form the first light shielding material 41. The lower adhesive layer 16 and the lower polarizer 17 are sequentially attached to the TFT array substrate 15.

Alternatively, the lower polarizer 17 with the lower adhesive layer 16 is provided, and the lower polarizer 17 with the lower adhesive layer 16 is attached to the TFT array substrate 15. The surface of the lower polarizer 17 away from the lower adhesive layer 16 is printed with ink to form the second light shielding portion 52. The backlight module 20 is assembled. The elastic glue is applied to form the first light shielding portion 51.

The display device 100 (200, 300, 400) may be any product or component having a display function, such as a mobile phone, a liquid crystal display, a liquid crystal television, a tablet computer, a digital photo frame, a wearable device, and so on.

It is to be understood, even though information and advantages of the present exemplary embodiments have been set forth in the foregoing description, together with details of the structures and functions of the present exemplary embodiments, the disclosure is illustrative only. Changes may be made in detail, especially in matters of shape, size, and arrangement of parts within the principles of the present exemplary embodiments to the full extent indicated by the plain meaning of the terms in which the appended claims are expressed.

What is claimed is:

1. A display device, comprising:
    a display panel comprising:
        a thin film transistor (TFT) array substrate;
        a color filter (CF) substrate opposite to the TFT array substrate;
        a lower polarizer on a side of the TFT array substrate away from the CF substrate, the lower polarizer defining a first through hole;
        an upper polarizer on a side of the CF substrate away from the TFT array substrate, the upper polarizer defining a second through hole, wherein the display panel defines a display area configured for displaying images, a light transmission area surrounded by the display area, and a light shielding area between the display area and the light transmission area, the light shielding area surrounds the light transmission area, the first through hole and the second through hole are aligned with the light transmission area along a thickness direction of the display panel; and
        a first light shielding material on a side of the TFT array substrate away from the CF substrate, wherein at least a part of the first light shielding material is in the first through hole, the first light shielding material is aligned with the light shielding area and surrounds the light transmission area, the first light shielding material is configured for absorbing light from a side of the lower polarizer away from the TFT array substrate toward the light transmission area;
    a backlight module, wherein the display panel comprises a display surface, the backlight module is on a side of the display panel away from the display surface, the backlight module defines a mounting hole aligned with the first through hole; and
    a camera module in the mounting hole;
    wherein the backlight module comprises a back plate for carrying optical components of the backlight module, and the back plate comprises a flat plate-shaped bottom plate and a frame connected to the bottom plate, the frame is shaped to define an inner wall of the mounting hole;
    wherein the display device further comprises a first light shielding portion, the first light shielding portion is in direct contact with both the display panel and the frame to fix the display panel and the frame; the first light shielding portion is aligned with the light shielding area and surrounds the light transmission area;
    wherein the first light shielding material is between the TFT array substrate and the lower polarizer;
    the display device further comprises a second light shielding portion, the second light shielding portion is between the lower polarizer and the frame, wherein the second light shielding portion is in the light shielding area and surrounds the light transmission area; and
    the second light shielding portion extends beyond the frame in a direction away from the light transmission area of the frame.

2. The display device according to claim 1, wherein the CF substrate comprises a second light shielding material, the second light shielding material is aligned with the light shielding area and surrounds the light transmission area.

3. The display device according to claim 1, further comprising a lower adhesive layer, wherein the TFT array substrate and the lower polarizer are bonded together by the lower adhesive layer, and the first through hole penetrates the lower adhesive layer.

4. The display device according to claim 1, wherein the first light shielding material comprises a first horizontal portion, a bent portion, and a second horizontal portion, wherein
    the first horizontal portion partially covers the TFT array substrate;
    the bent portion extends from the first horizontal portion and covers sidewalls of the first through hole;
    the second horizontal portion extends from the bent portion in a direction away from the light transmission area, and covers a surface of the lower polarizer away from the TFT array substrate; and
    the second horizontal portion extends beyond the frame in a direction away from the light transmission area of the frame.

5. The display device according to claim 1, wherein a side surface of the first light shielding material close to the light transmission area extends beyond the frame;
    a gap is defined between the frame and the first light shielding material, and the first light shielding portion is at least in the gap;
    a material of the first light shielding portion is elastic glue.

6. The display device according to claim 1, wherein a material of the lower adhesive layer is soft glue;
    a projection of the frame along the thickness direction of the display device at least partially overlaps the lower polarizer.

7. The display device according to claim 1, wherein the first light shielding material and the second light shielding portion are made of ink.

8. The display device according to claim 1, wherein the first light shielding material is made of ink, and the second light shielding portion is made of a double-sided tape.

9. The display device according to claim 5, wherein the frame is in direct contact with the second light shielding portion.

10. The display device according to claim 6, wherein the lower adhesive layer is made of a pressure sensitive adhesive or an optically clear adhesive.

11. A display device, comprising:
    a display panel comprising:
        a thin film transistor (TFT) array substrate;
        a color filter (CF) substrate opposite to the TFT array substrate;
        a lower polarizer on a side of the TFT array substrate away from the CF substrate, the lower polarizer defining a first through hole;

an upper polarizer on a side of the CF substrate away from the TFT array substrate, the upper polarizer defining a second through hole, wherein the display panel defines a display area configured for displaying images, a light transmission area surrounded by the display area, and a light shielding area between the display area and the light transmission area, the light shielding area surrounds the light transmission area, the first through hole and the second through hole are aligned with the light transmission area along a thickness direction of the display panel; and a first light shielding material on a side of the TFT array substrate away from the CF substrate, wherein at least a part of the first light shielding material is in the first through hole, the first light shielding material is aligned with the light shielding area and surrounds the light transmission area, the first light shielding material is configured for absorbing light from a side of the lower polarizer away from the TFT array substrate toward the light transmission area;

a backlight module, wherein the display panel comprises a display surface, the backlight module is on a side of the display panel away from the display surface, the backlight module defines a mounting hole aligned with the first through hole; and a camera module in the mounting hole;

wherein the backlight module comprises a back plate for carrying optical components of the backlight module, and the back plate comprises a flat plate-shaped bottom plate and a frame connected to the bottom plate, the frame is shaped to define an inner wall of the mounting hole;

wherein the display device further comprises a first light shielding portion, the first light shielding portion is in direct contact with both the display panel and the frame to fix the display panel and the frame; the first light shielding portion is aligned with the light shielding area and surrounds the light transmission area;

wherein a side surface of the first light shielding material close to the light transmission area extends beyond the frame;

a gap is defined between the frame and the first light shielding material, and the first light shielding portion is at least in the gap;

a material of the first light shielding portion is elastic glue.

12. The display device according to claim 11, wherein the CF substrate comprises a second light shielding material, the second light shielding material is aligned with the light shielding area and surrounds the light transmission area.

13. The display device according to claim 11, further comprising a lower adhesive layer, wherein the TFT array substrate and the lower polarizer are bonded together by the lower adhesive layer, and the first through hole penetrates the lower adhesive layer.

14. The display device according to claim 11, wherein the first light shielding material is made of ink, and the second light shielding portion is made of a double-sided tape.

15. The display device according to claim 11, wherein the lower adhesive layer is made of a pressure sensitive adhesive or an optically clear adhesive.

* * * * *